US012564855B2

(12) United States Patent
Slingerland et al.

(10) Patent No.: US 12,564,855 B2
(45) Date of Patent: Mar. 3, 2026

(54) HIGH PRESSURE NOZZLE

(71) Applicant: P. BEKKERS HOLDING B.V., Ouddorp (NL)

(72) Inventors: Marinus Jan Slingerland, Oud-Beijerland (NL); Dingenus Van Der Wielen, Oud-Beijerland (NL)

(73) Assignee: P. BEKKERS HOLDING B.V., Ouddorp (NL)

( * ) Notice: Subject to any disclaimer, the term of this patent is extended or adjusted under 35 U.S.C. 154(b) by 492 days.

(21) Appl. No.: 17/996,687

(22) PCT Filed: Apr. 22, 2021

(86) PCT No.: PCT/EP2021/060503
§ 371 (c)(1),
(2) Date: Oct. 20, 2022

(87) PCT Pub. No.: WO2021/214202
PCT Pub. Date: Oct. 28, 2021

(65) Prior Publication Data
US 2023/0219110 A1     Jul. 13, 2023

(30) Foreign Application Priority Data
Apr. 22, 2020    (NL) ..................................... 2025395

(51) Int. Cl.
*B05B 15/18*        (2018.01)
*B05B 3/00*         (2006.01)
(Continued)

(52) U.S. Cl.
CPC .............. *B05B 15/18* (2018.02); *B05B 3/002* (2013.01); *B05B 3/027* (2013.01); *B05B 3/06* (2013.01);
(Continued)

(58) Field of Classification Search
CPC ........... B05B 15/18; B05B 3/027; B05B 3/06; B05B 3/002; B05B 13/0636; F16C 17/045; F16C 33/107; B08B 9/0433
(Continued)

(56) References Cited

U.S. PATENT DOCUMENTS 4,135,771 A    1/1979   Huber et al.
5,253,809 A    10/1993  Poppitz
(Continued)

FOREIGN PATENT DOCUMENTS

| AU | 2013207556 B2 | 9/2015 |
| EP | 0082375 A2 | 6/1983 |
| WO | 2011046575 A1 | 4/2011 |
| WO | 2019098831 A1 | 5/2019 |
| WO | 2020081944 A1 | 4/2020 |

*Primary Examiner* — Kevin Edward Schwartz
(74) *Attorney, Agent, or Firm* — FisherBroyles, LLP; Roger L. Browdy; Ronni S. Jillions

(57) ABSTRACT

A high pressure nozzle, including a longitudinal housing, with an internal channel therein, a nozzle head support shaft, which is rotatably arranged partially in the internal channel, a rotary nozzle head, which is attached to the nozzle head support shaft and arranged outside the housing, and an axial bearing seat, which is located within the housing and which comprises an axial bearing surface that faces an end surface of the nozzle head support shaft. The axial bearing surface and the support shaft end surface, during use, cooperate to form an axial bearing for the nozzle head support shaft and the axial bearing seat includes an axial bore in the axial bearing surface that is aligned concentrically with an axis of rotation of the nozzle.

13 Claims, 6 Drawing Sheets

(51) Int. Cl.

| | |
|---|---|
| *B05B 3/02* | (2006.01) |
| *B05B 3/06* | (2006.01) |
| *B05B 13/06* | (2006.01) |
| *B08B 9/043* | (2006.01) |
| *F16C 17/04* | (2006.01) |
| *F16C 33/10* | (2006.01) |

(52) U.S. Cl.
CPC .......... *B08B 9/0433* (2013.01); *F16C 17/045* (2013.01); *F16C 33/107* (2013.01); *B05B 13/0636* (2013.01)

(58) Field of Classification Search
USPC ........................................ 239/589, 259, 251
See application file for complete search history.

(56) References Cited

U.S. PATENT DOCUMENTS

| | | | | |
|---|---|---|---|---|
| 5,695,405 | A | 12/1997 | Kono | |
| 5,909,848 | A * | 6/1999 | Zink ....................... | B05B 3/003 |
| | | | | 188/185 |
| 6,193,169 | B1 * | 2/2001 | Steinhilber ............ | B05B 3/003 |
| | | | | 239/240 |
| 2013/0200177 | A1 * | 8/2013 | Wright ................... | B05B 15/18 |
| | | | | 239/259 |
| 2014/0275722 | A1 * | 9/2014 | Zimmermann ........... | F04D 1/00 |
| | | | | 600/16 |
| 2015/0196928 | A1 | 7/2015 | Wojciechowski, III | |
| 2020/0121835 | A1 * | 4/2020 | Farago ................ | A61M 60/216 |
| 2021/0370326 | A1 * | 12/2021 | Van Der Wielen ... | F16C 17/105 |

* cited by examiner

11

12

1

20

30

HIGH PRESSURE NOZZLE

FIELD OF THE INVENTION

The present invention relates to a high pressure nozzle that is used to clean surfaces, for example for cleaning inner surfaces of pipes or tubes, such as pipes or tubes of a heat exchanger. The present invention further relates to an axial pressure compensator for such a high pressure nozzle.

STATE OF THE ART

WO 2019/098831 A1 discloses a high-pressure nozzle that comprises a longitudinal housing, a nozzle head support shaft that is rotatably arranged partially within the housing, and a rotary nozzle head, which is attached to the nozzle head support shaft and arranged outside the housing. This nozzle further comprises an axial pressure compensator with an axial bearing surface that faces an end surface of the nozzle head support shaft.

This axial bearing surface will form a stop surface for the nozzle head support shaft and is configured to form an axial bearing for the nozzle head support shaft upon mechanical contact between both. During use, the axial bearing surface and the support shaft end surface may be in direct, e.g. mechanical contact with each other. Alternatively or additionally, a liquid may be provided between them to provide a fluid bearing film, such that the axial bearing surface and the nozzle head support shaft contact each other indirectly.

This known nozzle may thus provide for a theoretical central point-contact between the axial bearing surface and the support shaft end surface. In practice, however, this contact will become planar, having a larger surface area than only a point. Upon rotation between them, this planar contact will effect a relative velocity between the axial bearing surface and the nozzle head support shaft that is not equal to zero.

This provides the drawback that a relatively large amount of friction occurs between the stationary part of the nozzle, e.g. the axial bearing surface, and the rotary part of the nozzle, e.g. the nozzle head support shaft. This friction will slow down rotation, which is disadvantageous. The friction will furthermore induce wear, which reduces the lifetime of the nozzle.

THE PRESENT INVENTION

The present invention provides a high pressure nozzle. The present invention further provides an axial pressure compensator for a high pressure nozzle.

DETAILED DESCRIPTION

The high pressure nozzle according to the present invention comprises a longitudinal housing, comprising a liquid inlet end and a liquid outlet end opposite to the liquid inlet end and comprising an internal channel running from the liquid inlet end to the liquid outlet end. During use of the nozzle, the liquid inlet end may be connected to a pressure source, through which a pressurized liquid, for example water at a pressure level up to 3000 bars, may be supplied to the nozzle. The liquid thereby enters the nozzle at the liquid inlet end and flows through the internal channel towards the liquid outlet end of the housing.

The nozzle further comprises a nozzle head support shaft, which is rotatably arranged partially in the internal channel and which comprises a liquid channel in fluid communication with the internal channel, and a rotary nozzle head, which is attached to the nozzle head support shaft and arranged outside the housing. The fluid connection between the liquid channel in the nozzle head support shaft and the internal channel of the housing may provide that the pressurized liquid in the nozzle will flow through the liquid channel in the nozzle head support shaft during use.

The rotary nozzle head and the nozzle head support shaft are configured to rotate with respect to the longitudinal housing about a longitudinal axis of rotation to provide a rotating spraying of liquid jetted from the rotary nozzle head. Accordingly, the liquid may be jetted from one or more jetting channels in the rotary nozzle head that are aligned in a direction that is offset with respect to the longitudinal axis of rotation. This offset may provide for a rotational torque that may effect rotation of the nozzle head and the nozzle head support shaft with respect to the housing.

The nozzle furthermore comprises an axial bearing seat which is located within the housing and which comprises an axial bearing surface that faces an end surface of the nozzle head support shaft. This axial bearing seat is located adjacent to the nozzle head support shaft, e.g. upstream in a flow direction of the liquid in the internal channel of the nozzle. The axial bearing seat thereby faces the upstream end surface of the nozzle head support shaft, e.g. the end surface that is located in the housing and that is located opposite to the end at which the nozzle head is attached. The axial bearing surface and the support shaft end surface, during use, cooperate, e.g.

contact each other, to form an axial bearing for the nozzle head support shaft. This axial bearing is configured to prevent the nozzle head support shaft from being displaced along the longitudinal axis of rotation. Such displacements may otherwise be effected by reactional forces that occur as a result of the liquid that is jetted from the nozzle head. These reactional forces may be aligned in a direction opposite to the flow direction of the liquid in the internal channel, e.g. from the liquid outlet end towards the liquid inlet end. The support shaft end surface is in contact with the axial bearing surface, either directly, i.e. in which the support shaft end surface bears against the axial bearing surface, or indirectly, i.e. in which possibly a thin, e.g. lubricating, fluid film, e.g. water film, may be present in between the support shaft end surface and the axial bearing surface. The axial bearing surface forms a stop for the nozzle head support shaft to prevent displacement of the nozzle head support shaft.

According to the present invention, the axial bearing seat comprises an axial bore in the axial bearing surface that is aligned concentrically with the axis of rotation. This axial bore is located centrally in the axial bearing surface and provides that the support shaft end surface and the axial bearing seat are not in contact at the central part of the axial bearing surface, e.g. at or close to the axis of rotation.

Since the support shaft end surface and the axial bearing surface cannot contact each other at the axis of rotation, it is no longer possible to have a theoretical central-point contact or to have a flattened planar contact between them. Instead, the contact between the support shaft end surface and the axial bearing surface is spread across a larger surface, e.g. over the remaining part of the axial bearing surface that surrounds the central bore.

As a result of this larger contact area, the pressure resulting from the contact force of the nozzle head support shaft being forced against the axial bearing seat is lowered. The high pressure nozzle according to the present invention is therefore less prone to wear, which implies that the lifetime of the high pressure nozzle is increased as well. Furthermore, the reduced wear may provide that less heat is developed by the relative rotation between the nozzle head support shaft and the axial bearing seat, which contributes to the reliability and the lifetime of the high pressure nozzle.

In an embodiment, the axial bearing surface has a shape that mates with a shape of the support shaft end surface. Such a mating shape may provide that the axial bearing surface and the support shaft end surface may be evenly in contact with each other over the entire surface of the axial bearing seat, instead of one or more localized points of contact.

This spread contact may provide for an even distribution of the contact forces between the axial bearing surface and the nozzle head support shaft, which further improves the relative rotation between the housing and the nozzle head support shaft, by further reducing wear.

In a further embodiment, the axial bearing surface has a concave shape and the support shaft end surface has a mating convex shape. The concave axial bearing surface may have a radius of curvature that is similar, or preferably the same as the radius of curvature of the convex support shaft end surface. As such, the axial bearing surface and the support shaft end surface may snugly fit against each other to provide for an evenly-spread contact between them.

In an alternative embodiment, the axial bearing surface has a flat shape and the support shaft end surface has a mating flat shape. The flat shapes of the axial bearing surface and the support shaft end surface may provide that the axial bearing surface and the nozzle head support shaft may snugly fit against each other to provide for an evenly-spread contact between them.

In an embodiment of the nozzle, the axial bearing seat is fluidly connected to the internal channel. As such, during use of the nozzle, at least part of the liquid in the internal channel of the nozzle may flow towards the axial bearing seat, instead of only towards the nozzle head.

According to this embodiment, the nozzle is configured to establish a fluid film between the axial bearing surface and the support shaft end surface to form an axial fluid bearing for the nozzle head support shaft. The liquid may flow in between the axial bearing surface and the support shaft end surface during use of the nozzle, for example as the result of over pressure at the axial bearing seat. The fluid film is configured to effect that the axial bearing seat and the nozzle head support shaft are no longer in direct mechanical contact with each other. Instead, the fluid film in between them will rather provide for indirect contact between the axial bearing seat and the nozzle head support shaft, e.g. via the fluid film in between them.

The fluid film may provide for an even further reduced amount of friction and wear between the nozzle head support shaft and the axial bearing seat during use of the nozzle. As such, the rotational velocity of the nozzle head support shaft and the nozzle head may be even higher for a similar pressure level of the liquid that is fed into the nozzle. Furthermore, the wear may be reduced to a further extent.

As an alternative, the fluid connection for the axial bearing seat may be omitted, resulting in a dry contact between the nozzle head support shaft and the axial bearing seat. Compared to the known nozzles, such a dry axial bearing may still provide for reduced wear, as is for example explained above in relation to the axial bore of the axial bearing seat.

In an embodiment, the axial bearing seat comprises two or more grooves in the axial bearing surface, which are equally spaced about the axis of rotation. These grooves may provide a fluid connection between the axial bore of the axial bearing seat and the internal channel of the nozzle.

As such, the liquid may not only flow towards the outer contour of the axial bearing seat, but may also flow further inward towards the axial bore. During use of the nozzle, the fluid film may be fed with fluid along the entire axial bearing surface of the axial bearing seat, instead on only at the outer contour of the axial bearing seat.

Since the grooves are equally spaced about the axis of rotation, a rotationally-symmetric groove pattern may be obtained in the axial bearing surface, in order to contribute to a constant fluid film quality and/or fluid film thickness along the entire rotation, instead of having a varying fluid film quality and/or fluid film thickness along the rotation.

As such, a more even fluid film may be established between the nozzle head support shaft and the axial bearing seat, instead of possibly only localized at the outer contour of the axial bearing seat. This spread fluid film may provide for a further reduced amount of friction and wear of the nozzle.

Furthermore, the improved fluid film may provide for better cooling of the nozzle, in order to compensate for the heat that is developed by the contact between the nozzle head support shaft and the axial bearing seat upon relative rotation between them.

In a further embodiment of the nozzle, each of the grooves is aligned in a radial direction, seen with respect to the axis of rotation. Such a radial orientation of the grooves may provide that the length of the grooves, e.g. from the outer contour of the axial bearing seat towards the axial bore, is as short as possible. This short length may reduce the drop in the pressure level between the outer contour of the axial bearing seat and the axial bore.

Alternatively, the grooves may be aligned in a different direction, for example only having a component in the radial direction, in order to for example obtain a spiral groove pattern, when seen along the axis of rotation. The benefit of such spiral grooves may for example lie in the fact that the length of the grooves is relatively long, compared to the radial straight grooves that are relatively short.

As a further alternative, the nozzle may comprise grooves that are off-set with respect to the axis of rotation. The grooves may thereby extend in a direction parallel to a radial direction. However, this direction does not intersect with the axis of rotation, but is rather spaced at a distance therefrom. For example, the grooves may be aligned in-line with tangential directions of the central axial bore in the axial bearing seat.

In a further embodiment of the nozzle, the grooves comprise a rectangular cross-section. Seen perpendicular to a longitudinal direction of the grooves, for example in a plane perpendicular to the radial direction in the embodiment described above, the grooves have the shape of a rectangle, for example having the shape of a square.

Alternatively, the grooves may comprise a triangular cross-section or a cross-section formed as a semi-circle, such as a cross-section having the shape of half a circle.

In an embodiment, in which the axial bearing seat is fluidly connected to the internal channel, the nozzle further comprises at least one bleed hole, which is fluidly connected to the axial bearing seat, in order to form a fluid connection with the surroundings of the nozzle.

According to this embodiment, the pressurized liquid may not only partially flow from the internal channel towards the axial bearing seat during use of the nozzle, but may also flow further towards the bleed holes. At the bleed holes, the liquid may exit the nozzle towards the surroundings. As a result, a bleed flow of liquid may be established from the internal channel towards the surroundings of the nozzle. During use of the nozzle, at least part of the liquid supplied at the liquid inlet end may flow through the internal channel, back via a slit in between the second housing part and the head end support shaft towards the axial bearing seat and eventually towards the surroundings of the nozzle via the bleed holes.

Accordingly, the fluid film between the axial bearing surface and the support shaft end surface may be constantly replenished with new liquid during use. Since liquid is discharged via the bleed holes, heat may be guided away from the axial bearing, towards the surroundings, which may provide for an even further improved cooling of the nozzle.

In the surroundings of the nozzle, the pressure level is at an ambient pressure level, whereas the pressure of the liquid in the internal channel of the nozzle may be relatively high during use of the nozzle. A pressure drop may thereby occur between the internal channel and the axial bearing seat, which may effect the flow of liquid from the internal channel to the axial bearing seat.

Furthermore, another pressure drop may occur between the axial bearing seat and the bleed holes, resulting in a slight over-pressure at the axial bearing seat, compared to the ambient pressure level. This over-pressure may force the liquid between the support shaft end surface and the axial bearing surface during use of the nozzle, in order to contribute in the forming of the fluid film.

In an embodiment, the axial bearing seat comprises a plastic material. Such a plastic material may have a relatively low coefficient of friction, which may result in relatively low frictional forces upon rotation of the nozzle head support shaft, for example in combination with a nozzle head support shaft that is made of a metallic material, such as stainless steel.

For example, the plastic material may be a fibrous self-lubricating plastic material, such as Iglidur® X. Such a self-lubricating plastic material may comprise components in the material itself that act as a lubricant. As such, it is not needed to provide for a separate lubricant or for a fluid film, since the plastic material itself may act as a lubricant, for reducing friction.

The use of such self-lubricating plastics may be particularly beneficial for dry axial bearings, in which no fluid film is present between the axial bearing seat and the nozzle head support shaft. Although the absence of the fluid film may normally result in larger frictional forces, may the self-lubricating plastic material provide for a reduction in frictional forces.

A further advantage of plastic material is that, as a result of its relatively low hardness, a metallic nozzle head support shaft may wear in the plastic axial bearing surface until a smooth and even contact is obtained. As soon as this smooth contact is obtained, the support shaft end surface and the axial bearing surface may snugly fit against each other to provide for the evenly-spread contact to which is referred above. At this point, the contact between the support shaft end surface and the axial bearing surface is spread across a larger surface, e.g. over the remaining part of the axial bearing surface that surrounds the central bore. As a result of this larger contact area, the pressure resulting from the contact force of the nozzle head support shaft being forced against the axial bearing seat is lowered. Due to the lowered contact force, the axial bearing seat may thereafter become less prone to wear.

In an embodiment, the axial bearing seat comprises a metallic material, for example comprising brass. The use of such a metallic material may provide for improved cooling, due to the relatively large thermal conductivity of metallic materials. The use of brass as a material for the axial bearing seat may be particularly beneficial, since it also possesses a self-lubricating effect, in order to reduce the friction between the axial bearing surface and the support shaft end surface upon rotation of the nozzle head support shaft during use of the nozzle.

In an embodiment of the nozzle, the axial bearing surface comprises a coating. Such a coating may for example be applied to reduce the friction between the nozzle head support shaft and the axial bearing seat. Additionally or alternatively, the coating may comprise a relatively large hardness, in order to have an improved resistance against wear.

In an embodiment of the nozzle, the support shaft end surface comprises a coating. Such a coating may for example be applied to reduce the friction between the nozzle head support shaft and the axial bearing seat. Additionally or alternatively, the coating may comprise a relatively large hardness, in order to have an improved resistance against wear.

The coating may for example comprise a tungsten carbide (WC) material that is applied on the support shaft end surface to bear against the axial bearing surface of the axial bearing seat.

In an embodiment, the axial bearing seat is provided as an insert piece, which is arranged within an axial bore of the nozzle. As such, the axial bearing seat is separate from the housing of the nozzle, and can thus be replaced with another axial bearing seat. This may be beneficial when a first axial bearing seat has been worn out, whereas a remainder of the nozzle has not been worn. By replacing the initial axial bearing seat with a new axial bearing seat, the nozzle can be used again as if it were a completely new nozzle.

The axial bore in the nozzle may be provided as a blind bore in the housing that is located adjacent to the nozzle head support shaft, seen along the longitudinal axis of the nozzle. With the axial bearing seat being provided as an insert piece in this axial bore of the nozzle, it is only required to accurately machine the insert piece to form an accurately-dimensioned axial bearing seat. It is thereby not necessary to machine an axial bearing surface within the tight confinements of a nozzle housing. As such, the manufacturing of the nozzle according to this embodiment may be made easier, and therefore less expensive.

As an alternative to the blind bore described above, the axial bore in the housing may also be a through bore in the housing, in order to effect that the axial bore in the axial bearing seat is in direct fluid communication with the liquid inlet end of the housing, such that the liquid may flow directly from the liquid inlet end towards the axial bearing seat during use of the nozzle.

The provision of a separate insert piece may further provide that the axial bearing seat may be made of a different material than the housing of the nozzle. The nozzle housing may thereby be made of a metallic material, such as stainless steel, whereas the axial bearing seat can be made of a plastic material, such as a fibrous self-lubricating plastic material.

In a further embodiment, the axial bore of the nozzle, e.g. the blind axial bore, may comprise a first bore section, having a first bore diameter and a first bore length along the longitudinal axis and a second bore section, having a second bore diameter and a second bore length along the longitudinal axis. The second bore section is located deeper than the first bore section, seen along the longitudinal axis, e.g. in a direction from the nozzle head support shaft towards the liquid inlet end. The first bore diameter is thereby larger than the second bore diameter and the first bore length is smaller than the second bore length, so that the axial bore, seen from the nozzle head support shaft towards the liquid inlet end, first comprises the first bore section, being relatively wide and shallow, and then comprises the second bore section, being relatively narrow and deep.

In accordance, the axial bearing seat comprises a first bearing seat section, having a first seat diameter and a first seat length along the longitudinal axis and a second seat section, having a second seat diameter and a second seat length along the longitudinal axis. The first seat diameter substantially corresponds to the first bore diameter and the second seat diameter substantially corresponds to the second bore diameter. Similarly, the first seat length substantially corresponds to the first bore length and the second seat length substantially corresponds to the second bore length. The first bearing seat section comprises the axial bearing surface and is located inside the first bore section and the second bearing seat section is located inside the second bore section, optionally both being provided with mating screw thread for securing the axial bearing seat in the axial bore.

This embodiment provides the advantage that the bulk of the axial bearing seat, e.g. the second bearing seat section, is relatively narrow, thus involving a relatively small amount of material. However, the axial bearing surface on the first axial bearing seat section is relatively large, enabling, at the same contact force between the nozzle head support shaft and the axial bearing surface, a lower contact pressure, thus resulting in less wear.

In an embodiment, the nozzle further comprises an axial pressure compensator, which is arranged in the internal channel and configured to substantially compensate axial pressure forces from liquid entering the internal channel at the liquid inlet end of the housing. Since the axial pressure forces are compensated by the axial pressure compensator, the required contact force at the axial bearing to prevent axial movements of the nozzle head support shaft in the housing is substantially reduced. As a consequence, the total quantity of liquid that is needed to clean a specific number of tubes is also reduced.

During use of the nozzle, the axial pressure compensator guides the liquid running through the internal channel of the housing such that the axial force resulting from the liquid entering the internal channel from an external pressure source is not transferred to the nozzle head support shaft. The axial pressure compensator may be designed to transfer the liquid between the housing and the nozzle head support shaft in a radial direction to prevent transfer of an axial pressure force from the liquid to the nozzle head support shaft.

Further, the compensation of the axial force by the axial pressure compensator facilitates the use of different nozzle heads, for example nozzle heads having different exit angles for the one or more jetting channels provided in the nozzle head. The exit angles of the jetting channels may be in the range of 0 degrees to 160 degrees with respect to the axis of rotation of the nozzle head. Thus the same combination of housing, axial pressure compensator and nozzle head support shaft may be used for different types of nozzle heads including nozzle heads having an angle of less than 90 degrees with respect to the axis of rotation and nozzle heads having an angle of more than 90 degrees with respect to the axis of rotation of the nozzle head.

In a further embodiment, the axial bearing seat is arranged within a blind axial bore of the axial pressure compensator. The axial pressure compensator may thereby be arranged centrally in the housing of the nozzle. The axial bearing may, in turn, be arranged centrally in the axial pressure compensator.

As such, the axial bearing seat is separate from the axial pressure compensator, and can thus be replaced with another axial bearing seat, without requiring replacement of the axial pressure compensator. This may be beneficial when a first axial bearing seat has been worn out, whereas the axial pressure compensator has not been worn. By replacing the initial axial bearing seat with a new axial bearing seat, the nozzle can be used again as if it were a completely new nozzle.

The blind axial bore in the axial pressure compensator may be provided as a blind bore in the housing, which is located adjacent to the nozzle head support shaft, seen along the longitudinal axis of the nozzle. During use of the nozzle, the liquid that is fed into the nozzle at the liquid inlet end of the housing may be guided radially outward by the axial pressure compensator, such that the liquid does not need to pass through the axial bearing seat.

With the axial bearing seat being provided as an insert piece in this blind axial bore of the axial pressure compensator, it is only required to accurately machine the axial bearing seat itself, without requiring machining of the axial pressure compensator. As such, the manufacturing of the nozzle according to this embodiment may be made easier, and therefore less expensive.

Furthermore, the provision of a separate axial bearing seat may provide that the axial bearing seat may be made of a different material than the axial pressure compensator. The axial pressure compensator housing may thereby be made of a metallic material, such as stainless steel, whereas the axial bearing seat can be made of a plastic material, such as a fibrous self-lubricating plastic material.

In an embodiment, the axial pressure compensator is an integral part of the longitudinal housing. The axial pressure compensator may thereto comprise a plurality of liquid guiding channels that extend through the housing, wherein an inlet opening of each liquid guiding channel is in fluid communication with the liquid inlet end of the housing and wherein an outlet opening of each liquid guiding channel is in fluid communication with the liquid channel of the nozzle head support shaft.

To allow liquid to pass from the liquid inlet end to the nozzle head support shaft during use of the nozzle, the liquid guiding channels may guide the liquid, while the axial forces resulting from liquid pressure of the liquid entering the nozzle at the liquid inlet end are not transferred to the nozzle head support shaft. Instead, these axial forces are guided through the axial pressure compensator that forms part the housing.

The axial pressure compensator may comprise any suitable number of liquid guiding channels, for example 10 to 30 liquid guiding channels, that are preferably equally distributed over the circumference of the axial pressure compensator.

In an alternative embodiment, the axial pressure compensator and the housing may be separate parts, such that an axial pressure compensator may be replaced independently of the housing.

The nozzle may for example comprise a housing with a first housing part and a second housing part, wherein the axial pressure compensator is clamped between the first housing part and the second housing part. By clamping the axial pressure compensator between the first housing part and the second housing part, the relative position of the axial pressure compensator with respect to the housing is guaranteed. The clamping force can also be used to create a circumferential sealing between the housing and the axial pressure compensator.

The present invention further provides an axial pressure compensator for a high-pressure nozzle, comprising the axial bearing seat that is described above. The axial pressure compensator is configured to be located within a housing of the nozzle and the axial bearing seat comprises an axial bearing surface that is configured to face an end surface of a nozzle head support shaft of the nozzle.

The axial bearing seat comprises an axial bore in the axial bearing surface that is aligned concentrically with an axis of rotation of the nozzle. This axial bore is located centrally in the axial bearing surface and may provide, after being arranged in the nozzle, that the support shaft end surface and the axial bearing seat are not in contact at the central part of the axial bearing surface, e.g. at or close to the axis of rotation.

The axial bearing seat of the axial pressure compensator according to the present invention may further comprise one or more of the features of the axial bearing seat that is described above in relation to embodiments of the high pressure nozzle according to the present invention.

Since the support shaft end surface and the axial bearing surface cannot contact each other at the axis of rotation, it is no longer possible to have a theoretical central-point contact or to have a flattened planar contact between them. Instead, the contact between the support shaft end surface and the axial bearing surface is spread across a larger surface, e.g. over the remaining part of the axial bearing surface that surrounds the central bore.

As a result of this larger contact area, the pressure resulting from the contact force of the nozzle head support shaft being forced against the axial bearing seat is lowered.

The axial bearing seat of the axial pressure compensator according to the present invention is therefore less prone to wear, which implies that the lifetime of the axial bearing seat is increased as well. Furthermore, the reduced wear may provide that less heat is developed by the relative rotation between the nozzle head support shaft and the axial bearing seat, which contributes to the reliability and the lifetime of the axial bearing seat.

The axial pressure compensator according to the present invention may further be retrofitted in existing high pressure nozzles with an axial pressure compensator. This may provide that the existing high pressure nozzles, which initially did not comprise an axial bearing seat for forming an axial bearing with a nozzle head support shaft of the nozzle, can now be equipped with an axial bearing. As such, the wear may also be reduced for existing high pressure nozzles by means of the axial pressure compensator according to the present invention.

BRIEF DESCRIPTION OF DRAWINGS

Further characteristics of the invention will be explained below, with reference to embodiments, which are displayed in the appended drawings, in which.

Throughout the figures, the same reference numerals are used to refer to corresponding components or to components that have a corresponding function.

DETAILED DESCRIPTION OF EMBODIMENTS

Figure 1:
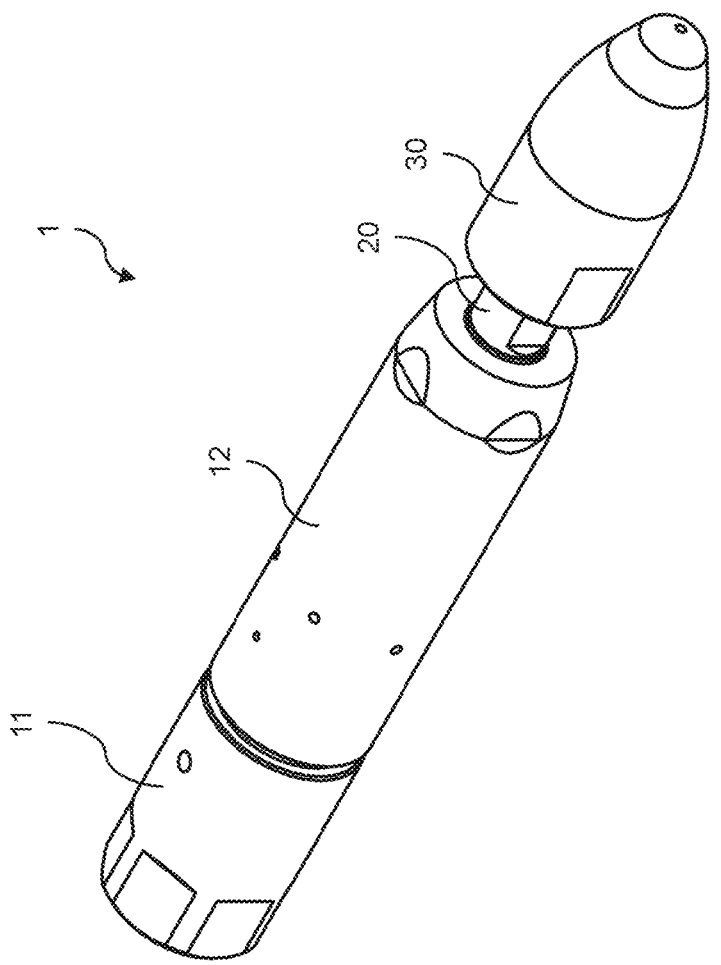
FIG. 1 schematically depicts an embodiment of the high pressure nozzle according to the present invention.

FIG. 1 schematically depicts an embodiment of the high pressure nozzle according to the present invention, to which is referred with reference numeral 1. The nozzle 1 comprises a longitudinal housing that has a first housing part 11 and a second housing part 12. The nozzle 1 further comprises a nozzle head support shaft 20, which is rotatably arranged partially in the housing 11,12, and a rotary nozzle head 30, which is attached to the nozzle head support shaft 20 and arranged outside the housing 11,12. According to the present embodiment, at least the housing 11,12, the nozzle head support shaft 20 and the nozzle head 30 are made of a metallic material, e.g. being made of stainless steel.

Figure 2:
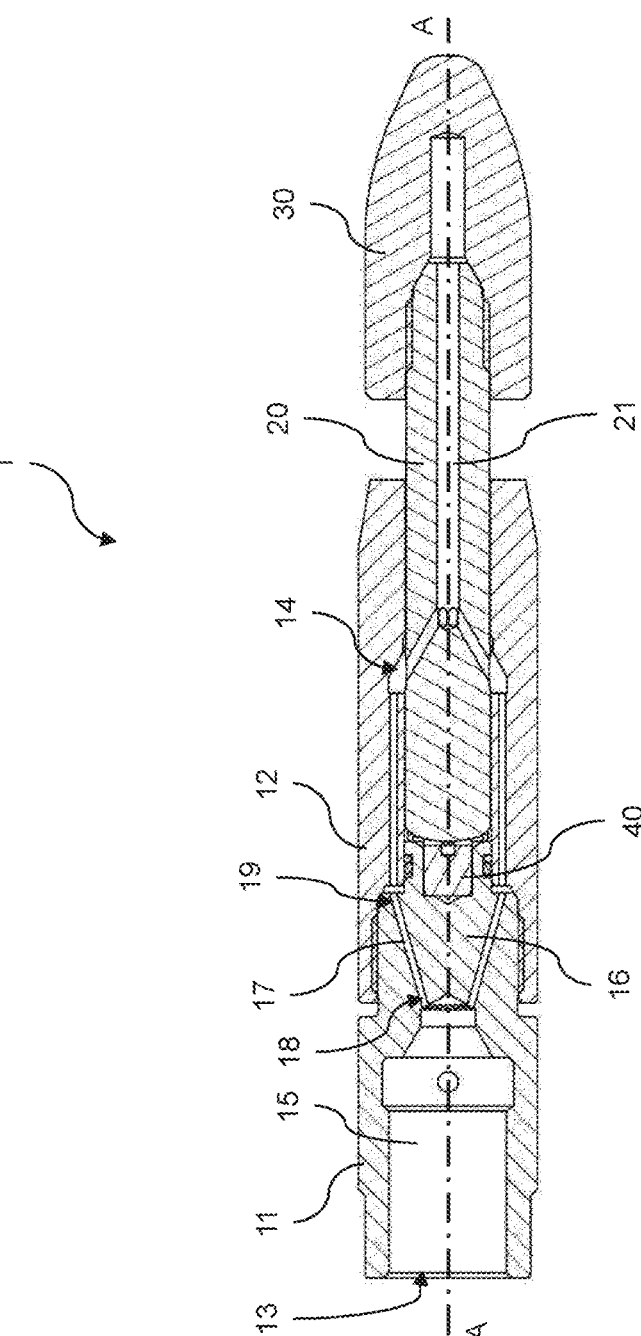
FIG. 2 schematically depicts a cross-sectional view in a plane along the axis of rotation onto the nozzle of FIG. 1.

FIG. 2 schematically depicts a cross-sectional view onto the nozzle 1 of FIG. 1. The plane of FIG. 2 is aligned parallel to a longitudinal axis of rotation A-A of the nozzle head support shaft 20 inside the housing 11,12. It is visible in FIG. 2 that the housing 11,12 comprises a liquid inlet end 13 and a liquid outlet end 14 opposite to the liquid inlet end 13. The nozzle 1 further comprises an internal channel 15 running from the liquid inlet end 13 to the liquid outlet end 14. During use of the nozzle 1, the liquid inlet end 13 may be connected to a pressure source, through which a pressurized liquid may be supplied to the nozzle 1. The liquid thereby enters the nozzle 1 at the liquid inlet end 13 and flows through the internal channel 15 towards the liquid outlet end 14 of the housing 11,12. At the liquid outlet end 14 of the housing 11,12, the liquid is then configured to flow into the nozzle head support shaft 20.

The nozzle head support shaft 20 comprises a liquid channel 21 in fluid communication with the internal channel 15 at the liquid outlet end 14. This fluid communication provides that the pressurized liquid in the nozzle 1 will flow from the internal channel 15 to the liquid channel 21 in the nozzle head support shaft 20 during use. The rotary nozzle head 30 and the nozzle head support shaft 20 are thereby configured to rotate with respect to the housing 11,12 about the axis of rotation A-A to provide a rotating spraying of liquid jetted from the rotary nozzle head 30.

The nozzle 1 further comprises an axial pressure compensator 16, which is arranged in the internal channel 15 and configured to substantially compensate axial pressure forces from liquid entering the internal channel 15 at the liquid inlet end 13 of the housing 11,12. The axial pressure compensator 16 is, in the present embodiment, an integral part of the housing 11,12 and comprises a plurality of liquid guiding channels 17 that extend through the housing 11,12. Each of the liquid guiding channels 17 comprises an inlet opening 18' that is in fluid communication with the liquid inlet end 13 of the housing 11,12 and comprises an outlet opening 18" that is in fluid communication with the liquid outlet end 14 of the housing 11,12 and with the liquid channel 21 of the nozzle head support shaft 20. To allow liquid to pass from the liquid inlet end 13 to the nozzle head support shaft 20 during use of the nozzle 1, the liquid guiding channels 17 may guide the liquid, while the axial forces resulting from liquid pressure of the liquid entering the nozzle 1 at the liquid inlet end 13 are not transferred to the nozzle head support shaft 20. In particular, axial pressure forces are prevented to act onto the nozzle head support shaft 20 as a result of the liquid flowing from the internal channel 15 into the liquid channel 21 of the nozzle head support shaft 20 in a radial inward direction, see with respect to the axis of rotation A-A.

The nozzle 1 furthermore comprises an axial bearing seat 40 which is located within the first housing part 11 and which is arranged within a blind axial bore of the axial pressure compensator 16 as an insert piece. The axial bearing seat 40 comprises an axial bearing surface 41 that faces the respective end surface 22 of the nozzle head support shaft 20 that is located in the housing 11,12 and that is located opposite to the end at which the nozzle head 30 is attached of the nozzle head support shaft 20.

Figure 3:
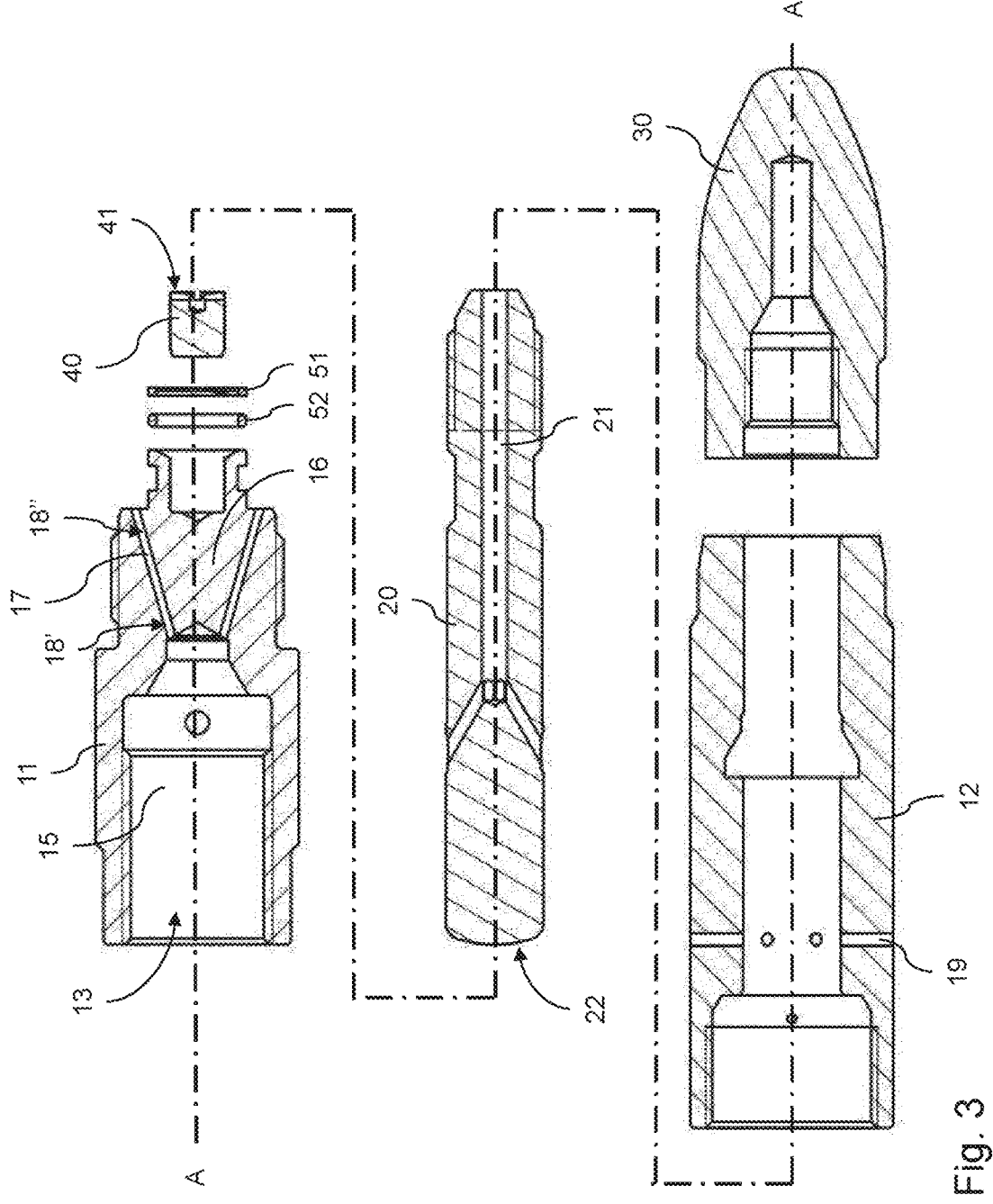
FIG. 3 shows an exploded-view representation of the cross-section in FIG. 2.

It is best displayed in the exploded-view representation of FIG. 3 that the axial bearing surface 41 and the support shaft end surface 22, during use, cooperate, e.g. contact each other, to form an axial bearing for the nozzle head support shaft 20. This axial bearing is configured to prevent the nozzle head support shaft 20 from being displaced along the longitudinal axis of rotation A-A.

The axial bearing seat 40 is fluidly connected to the internal channel 15. The nozzle 1 is thereby configured to establish a fluid film between the axial bearing surface 41 and the support shaft end surface 22 to form an axial fluid bearing for the nozzle head support shaft 20. The liquid may flow in between the axial bearing surface 41 and the support shaft end surface 22 during use of the nozzle 1, which implies that the axial bearing seat 40 and the nozzle head support shaft 20 are not in direct mechanical contact with each other, but rather indirectly via the fluid film.

The nozzle 1 further comprises multiple bleed holes 19 which are arranged in the second housing part 12. The bleed holes 19 form a fluid passage through the walls of the second housing part 12 and fluidly interconnect the axial bearing seat 40 and the surroundings of the nozzle 1. At the bleed holes 19, the liquid may exit the nozzle 1 and a bleed flow of liquid may be established towards the surroundings of the nozzle 1. In particular, at least part of the liquid supplied to the nozzle 1 at the liquid inlet end 13 may flow through the internal channel 15, via the liquid guiding channels 17 in the axial pressure compensator 16, back via a slit in between the second housing part 12 and the head end support shaft 20 towards the axial bearing seat 40 and eventually towards the surroundings of the nozzle 1 via the bleed holes 19. A pressure drop may be present at the bleed holes 19, resulting in a slight over-pressure at the axial bearing seat 40, compared to an ambient pressure level. This over-pressure may force the liquid between the support shaft end surface 22 and the axial bearing surface 41 during use of the nozzle 1, in order to contribute in the forming of the fluid film.

In between the first housing part 11 and the second housing part 12, the nozzle 1 comprises a first sealing ring 51 and a second sealing ring 52. Both rings 51,52 are configured to seal-off a seam between the housing parts 11,12 to prevent the passage of fluid therein between. The first sealing ring is embodied as a rubber O-ring 51 and the second sealing ring is embodied as a backup-sealing ring 52 made of PTFE. The second sealing ring 52 may be relatively stiff and may therefore be configured to provide additional mechanical stiffness for the O-ring 51, which is relatively weak by itself.

Figure 4C:
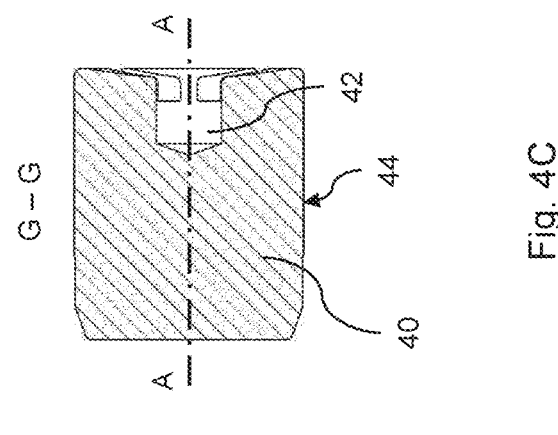
FIG. 4C shows a cross-sectional view on the axial bearing seat along line G-G in FIG. 4B, and FIGS. 5A-5K schematically depict various different axial bearing seats.
Figure 4B:
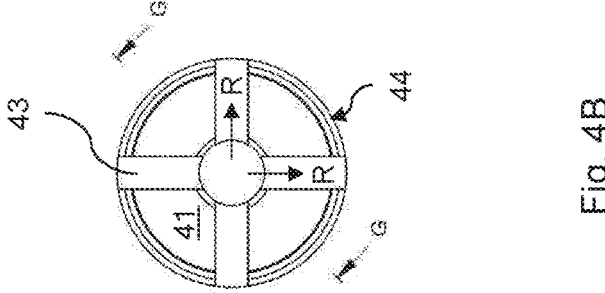
FIG. 4B shows a front view on the axial bearing surface of the axial bearing seat in FIG. 4A.
Figure 4A:
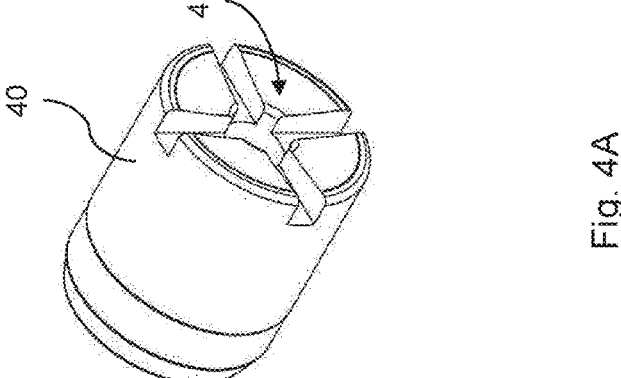
FIG. 4A shows an isometric view on the axial bearing seat of the nozzle in FIG. 1.

FIGS. 4A-4C display an embodiment of the axial bearing seat 40 in more detail. The axial bearing seat 40 comprises an axial bore 42 in the axial bearing surface 41 that is aligned concentrically with the axis of rotation A-A. This axial bore 42 is located centrally in the axial bearing surface 41 and provides that the support shaft end surface 22 and the axial bearing seat 40 are not in contact at the central part of the axial bearing surface 41. Instead, the contact between the support shaft end surface 22 and the axial bearing surface 41 is spread over the remaining part of the axial bearing surface 41 that surrounds the central axial bore 42.

The axial bearing surface 41 has a concave shape and the support shaft end surface 22 has a mating convex shape. The concave axial bearing surface 41 has a radius of curvature that is the same as the radius of curvature of the convex support shaft end surface 22. As such, the axial bearing surface 41 and the support shaft end surface 22 may snugly fit against each other to provide for an evenly-spread contact between them, thereby providing, during use of the nozzle 1, for a fluid film between them with constant thickness.

Since the axial bearing seat 40 is provided as separate insert piece in the metallic axial pressure compensator 16, it may be made of a different material, e.g. other than a metallic material. As such, the axial bearing seat 40 comprises a plastic material that is a fibrous self-lubricating plastic material. According to the present embodiment, the entire axial bearing seat 40 is made of Iglidur® X, which is a certain type of self-lubricating plastic material.

The axial bearing seat 40 according to the embodiment in FIGS. 4A-4C comprises four grooves 43 in the axial bearing surface 41, which are equally spaced about the axis of rotation A-A. These grooves 43 provide a fluid connection between the axial bore 42 in the axial bearing seat 40 and the internal channel 15 of the nozzle 1. As such, the liquid may not only flow towards an outer contour 44 of the axial bearing seat 40, but may also flow further inward towards the axial bore 42. During use of the nozzle 1, the fluid film may be fed with fluid along the entire radius R of the axial bearing seat 40, instead of only at the outer contour 44 of the axial bearing seat 40.

Each of the grooves 43 is aligned in a radial direction R, seen with respect to the axis of rotation A-A. Such a radial orientation of the grooves 43 provides that the length of the grooves 43, e.g. from the outer contour 44 of the axial bearing seat 40 towards the axial bore 42, is as short as possible.

Furthermore, the grooves 43 comprise a rectangular cross-section. Seen in a plane perpendicular to the radial direction R of the axial bearing seat 40, the grooves 40 thereby have the shape of a rectangle.

In FIGS. 5A-5F, various different axial bearing seats are depicted schematically, which all comprise a different number of grooves. In FIGS. 5A-5F, a front view on the axial bearing surface of the respective axial bearing seat is shown on the left and an isometric view on the respective axial bearing seat is shown on the right.

Figures 5A, 5B, 5C, 5D, 5E, 5F, 5G, 5H:
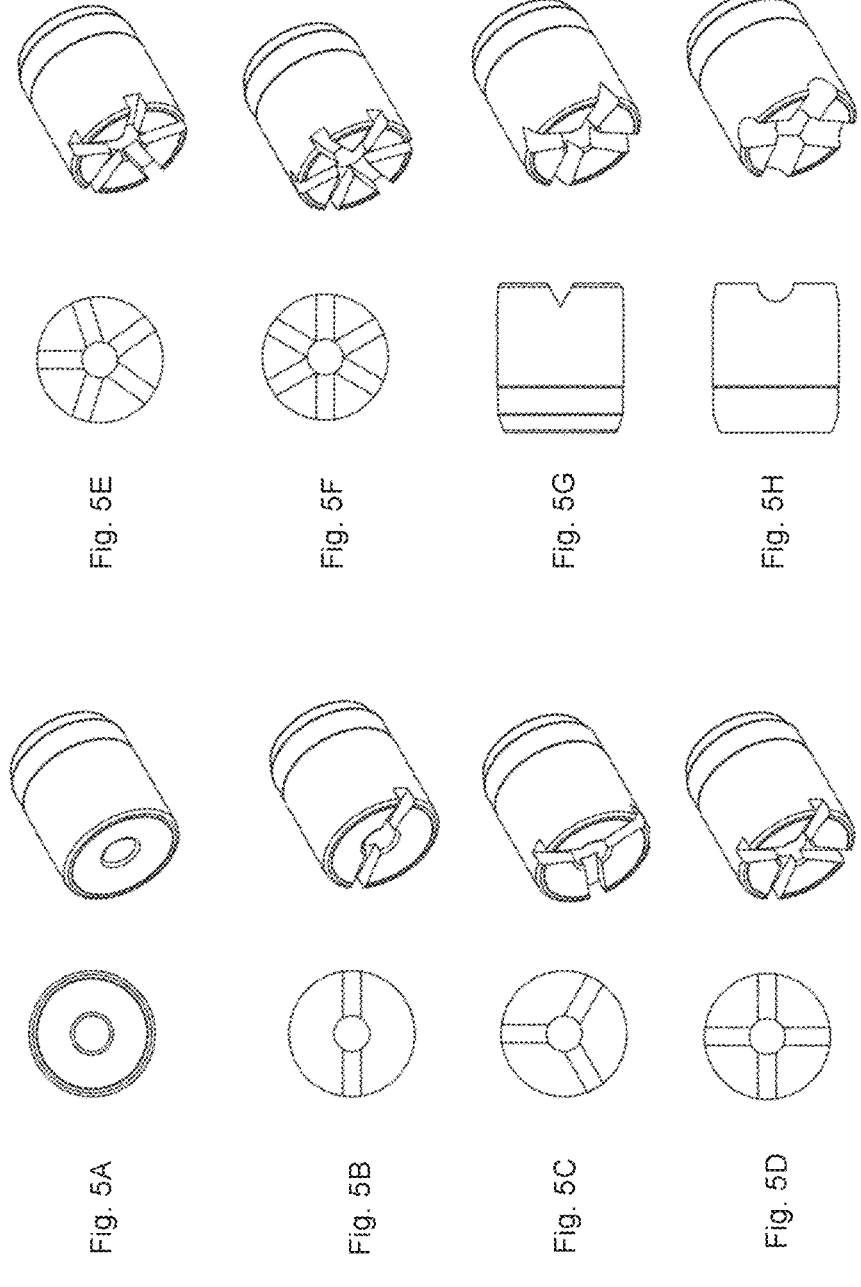

FIG. 5A shows an axial bearing seat that is free of grooves in its axial bearing surface. This axial bearing seat only comprises the axial bore in the axial bearing surface and the remaining axial bearing surface has a smooth and annular shape to contact the nozzle head support shaft.

FIG. 5B shows an axial bearing seat that comprises an axial bore and two grooves in the axial bearing surface. The grooves are equally spaced at 180° about the axis of rotation.

FIG. 5C shows an axial bearing seat that comprises an axial bore and three grooves in the axial bearing surface. The grooves are equally spaced at 120° about the axis of rotation.

FIG. 5D shows the axial bearing seat that is also displayed in FIGS. 4A-4C. This axial bearing seat comprises an axial bore and four grooves in the axial bearing surface. The grooves are equally spaced at 90° about the axis of rotation. FIG. 5E shows an axial bearing seat that comprises an axial bore and five grooves in the axial bearing surface. The grooves are equally spaced at 72° about the axis of rotation.

FIG. 5F shows an axial bearing seat that comprises an axial bore and six grooves in the axial bearing surface. The grooves are equally spaced at 60° about the axis of rotation.

The axial bearing seats in FIGS. 5A-5F all comprise grooves that have a rectangular cross-section. In FIGS. 5G and 5H, two further different axial bearing seats are depicted schematically, which both comprise a different cross-sectional shape of the grooves. In FIGS. 5G and 5H, a side view on the respective axial bearing seat is shown on the left and an isometric view on the respective axial bearing seat is shown on the right.

FIG. 5G thereby shows an axial bearing seat that comprises four grooves that have a triangular cross-section.

FIG. 5H shows an axial bearing seat that comprises four grooves that have a cross-section having the shape of half a circle.

It is understood that other embodiments of the axial bearing seat can be envisaged, which for example comprise a different number of grooves with a triangular cross-section or a semi-circular cross-section.

Figures 5I, 5J, 5K:
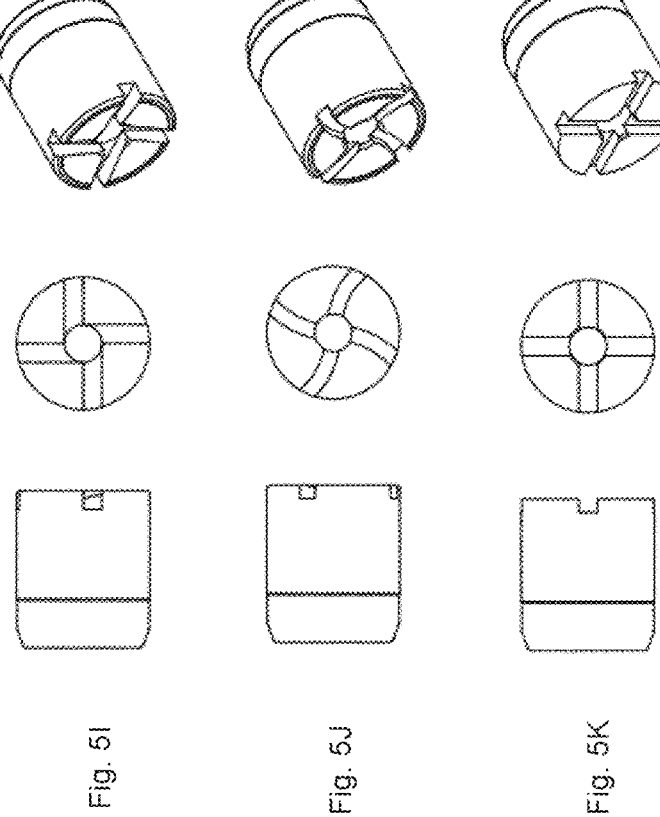

The axial bearing seats in FIGS. 5A-5H all comprise grooves that are aligned in the radial direction, seen with respect to the axis of rotation. In FIGS. 5I and 5J, two further different axial bearing seats are depicted schematically, which both comprise a different type of grooves, extending in different directions. In FIGS. 5I and 5J, a side view on the respective axial bearing seat is shown on the left, a front view on the axial bearing surface of the respective axial bearing seat is shown in the middle and an isometric view on the respective axial bearing seat is shown on the right.

FIG. 5I thereby shows an axial bearing seat that comprises four grooves that have a rectangular cross-section and that are off-set with respect to the axis of rotation. The grooves thereby extend in a direction parallel to a radial direction. However, this direction does not intersect with the axis of rotation, but is rather spaced at a distance therefrom. According to the embodiment in FIG. 5I, the grooves are aligned in-line with tangential directions of the central axial bore in the axial bearing seat.

FIG. 5J shows an axial bearing seat that comprises four grooves that have a rectangular cross-section and that extend spirally away from the central bore. These grooves do not extend along a straight line, but rather extend along a curved line to obtain a spiral groove pattern.

It is understood that other embodiments of the axial bearing seat can be envisaged, which for example comprise a different number of grooves and/or a different cross-section, while being aligned off-set with respect to the axis of rotation or being aligned spirally.

The axial bearing seats in FIGS. 5A-5J all comprise a concave axial bearing surface. In FIG. 5K, a further different axial bearing seat is depicted schematically, which comprises a flat axial bearing surface. In FIG. 5K, a side view on the respective axial bearing seat is shown on the left, a front view on the axial bearing surface of the respective axial bearing seat is shown in the middle and an isometric view on the respective axial bearing seat is shown on the right.

FIG. 5K thereby shows an axial bearing seat that comprises four grooves that have a rectangular cross-section. The axial bearing surface has a flat shape, in order to be associated with a support shaft end surface that has a mating flat shape. The flat shape of the axial bearing surface may provide that the axial bearing surface and the nozzle head support shaft may snugly fit against each other to provide for an evenly-spread contact between them.

It is understood that other embodiments of the axial bearing seat can be envisaged, which for example comprise a different number of grooves and/or a different cross-section and/or a different direction of extension, while comprising a flat axial bearing surface.

The invention claimed is:

1. A high pressure nozzle, comprising:
a longitudinal housing, comprising a liquid inlet end and a liquid outlet end opposite to the liquid inlet end and comprising an internal channel running from the liquid inlet end to the liquid outlet end,
a nozzle head support shaft, which is rotatably arranged partially in the housing and in part of the internal channel and which comprises a liquid channel in fluid communication with the internal channel,
a rotary nozzle head, which is attached to the nozzle head support shaft and arranged outside the housing, and
an axial bearing seat which is located within the housing and which comprises an axial bearing surface that faces an end surface of the nozzle head support shaft,
wherein the end surface is located in the housing and is located opposite to an end of the rotary nozzle head support shaft at which the nozzle head is attached,
wherein the rotary nozzle head and the nozzle head support shaft are configured to rotate with respect to the housing about a longitudinal axis of rotation to provide a rotating spray of liquid jetted from the rotary nozzle head, and
wherein the axial bearing surface and the end surface of the nozzle head support shaft, during use, cooperate to form an axial bearing for the nozzle head support shaft to prevent the nozzle head support shaft from being displaced along the longitudinal axis of rotation by reactional forces that occur as a result of the liquid that is jetted from the rotary nozzle head, and
wherein the axial bearing seat comprises an axial bore in the axial bearing surface that is aligned concentrically with the axis of rotation.

2. The high pressure nozzle according to claim 1, wherein the axial bearing surface has a shape that mates with a shape of the end surface of the nozzle head support shaft.

3. The high pressure nozzle according to claim 2, wherein the axial bearing surface has a concave shape and wherein the end surface of the nozzle head support shaft has a mating convex shape.

4. The high pressure nozzle according to claim 1, wherein the axial bearing seat is fluidly connected to the internal channel, and
wherein the high pressure nozzle is configured to establish a fluid film between the axial bearing surface and the end surface of the nozzle head support shaft to form an axial fluid bearing for the nozzle head support shaft.

5. The high pressure nozzle according to claim 1, wherein the axial bearing seat comprises two or more grooves in the axial bearing surface, which are equally spaced about the axis of rotation.

6. The high pressure nozzle according to claim 5, wherein each groove of the two or more grooves is aligned in a radial direction, seen with respect to the axis of rotation.

7. The high pressure nozzle according to claim 5, wherein the two or more grooves comprise a rectangular cross-section.

8. The high pressure nozzle according to claim 4, further comprising at least one bleed hole, which is fluidly connected to the axial bearing seat, in order to form a fluid connection with surroundings of the high pressure nozzle.

9. The high pressure nozzle according to claim 1, wherein the axial bearing seat comprises a plastic material.

10. The high pressure nozzle according to claim 1, wherein the axial bearing seat is provided as an insert piece, which is arranged within an axial bore of the high pressure nozzle.

11. The high pressure nozzle according to claim 1, further comprising an axial pressure compensator, which is arranged in the internal channel and configured to counter axial pressure forces from liquid entering the internal channel at the liquid inlet end of the housing.

12. The high pressure nozzle according to claim 11, wherein the axial bearing seat is arranged within a blind axial bore of the axial pressure compensator.

13. The high pressure nozzle according to claim 11, wherein the axial pressure compensator is an integral part of the housing.

\* \* \* \* \*